US006089979A

United States Patent [19]

Klein

[11] Patent Number: 6,089,979

[45] Date of Patent: Jul. 18, 2000

[54] GAME-CREDIT CONTROL AND ACCOUNTING APPARATUS

[76] Inventor: Gordon C. Klein, 1642 Crystal Creek Dr., Terre Haute, Ind. 47802

[21] Appl. No.: 08/947,591

[22] Filed: Oct. 9, 1997

Related U.S. Application Data

[60] Provisional application No. 60/028,300, Oct. 11, 1996.

[51] Int. Cl.[7] .......... G06F 15/28

[52] U.S. Cl. .......... 463/25; 463/26

[58] Field of Search .......... 463/16, 17, 18, 463/19, 20, 21, 25, 26, 27, 28; 273/138.1, 143 R, 138.2

[56] References Cited

U.S. PATENT DOCUMENTS

| | | | |
|---|---|---|---|
| 3,810,627 | 5/1974 | Levy . | |
| 4,339,798 | 7/1982 | Hedges et al. | 463/40 |
| 4,467,424 | 8/1984 | Hedges et al. | 463/40 |
| 4,531,187 | 7/1985 | Uhland | 463/12 |
| 4,575,622 | 3/1986 | Pellegrini | 463/25 |
| 4,636,951 | 1/1987 | Harlick . | |
| 4,880,237 | 11/1989 | Kishishita | 463/25 |
| 5,096,195 | 3/1992 | Gimmon . | |
| 5,179,517 | 1/1993 | Sarbin et al. . | |
| 5,197,094 | 3/1993 | Tillery et al. . | |
| 5,265,874 | 11/1993 | Dickinson et al. . | |
| 5,287,269 | 2/1994 | Dorrough et al. | 463/25 |
| 5,321,241 | 6/1994 | Craine . | |
| 5,332,076 | 7/1994 | Ziegert . | |
| 5,429,361 | 7/1995 | Raven et al. . | |
| 5,470,079 | 11/1995 | LeStrange et al. . | |

*Primary Examiner*—Jessica J. Harrison

*Attorney, Agent, or Firm*—Barnes & Thornburg

[57] ABSTRACT

A game-credit control apparatus suitable for use with gaming machines each configured to store accumulated credits in response to a game and to transmit a counter signal of accumulated credits in response to receiving a reset signal is disclosed. The game-credit control apparatus includes a junction box, a credit controller, and a payout counting mechanism. The junction box has multiple junction ports each of which are configured for communication with one gaming machine. The credit controller includes a connector communicating with the junction box and reset switches communicating with the connector. Each reset switch corresponds to one of the junction ports and is formed to selectively trigger a reset signal. The payout counting mechanism communicates with the connector and is formed to receive the counter signal of accumulated credits.

20 Claims, 12 Drawing Sheets

GAME-CREDIT CONTROL AND ACCOUNTING APPARATUS

CROSS REFERENCE TO RELATED APPLICATIONS

This claims priority under 35 U.S.C. §119(e) of Ser. No. 60/028,300 filed Oct. 11, 1996.

BACKGROUND AND SUMMARY OF THE INVENTION

The present invention relates to an apparatus that controls the credits of a gaming machine. More particularly, the present invention relates to a game-credit control apparatus that removes and transfers game credits from a gaming machine to a redemption center at a location remote from the gaming machine.

It is known to remotely credit and bill usage of electronic entertainment machines, see for example U.S. Pat. Nos. 5,197,094 and 5,429,361. These conventional systems, however, require expensive technology such as modems or card readers, keypads, and the like. In small establishments having a limited number of gaming machines, it would be desirable to have a game-credit control and accounting apparatus that monitors multiple gaming machines using relative inexpensive technology. Cost savings to the establishment can be achieved through the relatively low cost of the control and accounting device as well as the reduced labor expense since employees may remain in a central work area and carry on with other duties while redeeming game credits According to the present invention a game-credit control apparatus suitable for use with gaming machines each configured to store accumulated credits in response to a game and to transmit a counter signal of accumulated credits in response to receiving a reset signal is provided. The game-credit control apparatus comprises a junction box with junction ports, each junction port being formed for communication with one gaming machine, a credit controller with a connector communicating with the junction box, and reset switches. The reset switches communicate with the connector and selectively trigger a reset signal. In addition, each reset switch corresponds to one of the junction ports. The control apparatus of the present invention further comprises a payout counting mechanism communicating with the connector. The payout counting mechanism is formed to receive the counter signal of accumulated credits.

Additional features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
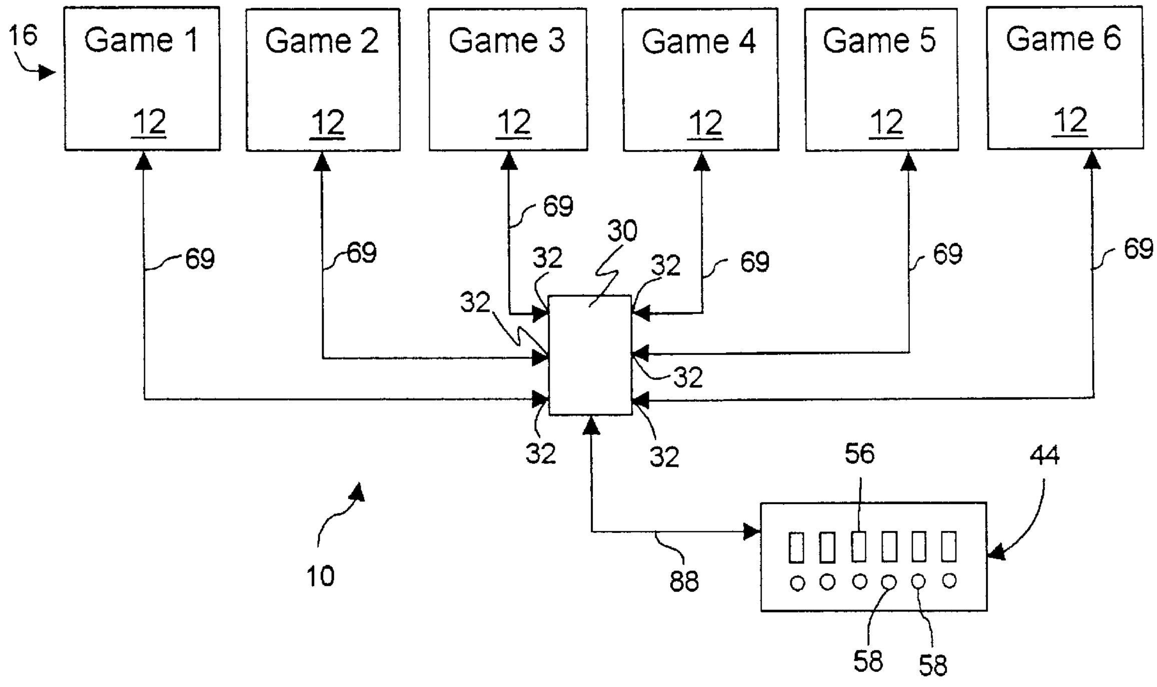
FIG. 1 is a diagrammatic illustration of a floor plan that includes six gaming machines coupled to a game-credit control apparatus in accordance with the present invention and showing the control apparatus including a junction box in communication with a credit controller.

As shown in FIG. 1, a game-credit control apparatus 10 in accordance with the present invention is designed to remove and transfer game credits from gaming machines 12 to a credit controller 44 positioned in a location remote from gaming machines 12. Control apparatus 10 is situated in an establishment (not shown) remote from gaming machines 12. Control apparatus 10 is suited for use with gaming machines 12 that are capable of receiving tokens and coins of various values as well as cards that contain various credit values. As shown in FIG. 1, control apparatus 10 is suitable for use with a bank 16 of six gaming machines 12 that are positioned to lie in a side-by-side relationship. It is understood, however, that gaming machines 12, may be scattered throughout the establishment and bank 16 may include three gaming machines or greater or fewer than six gaming machines 12 in accordance with the present invention. Although one gaming machine 12 will be discussed hereafter, it is understood that the discussion applies to each gaming machine 12.

Gaming machine 12 is a representative video poker machine provided with a cabinet (not shown) having a video screen (not shown) and displaying a plurality of visual displays (not shown) that interact with the player's input and display the number of credits that the player has accumulated. Control apparatus 10 in accordance with the present invention is equally appropriate for use with video slot machines. Control apparatus 10 may also be used with other types of gaming machines that store credits based upon the number of credits the users supply to gaming machine 12 and upon the outcome of the games played.

Figure 6:
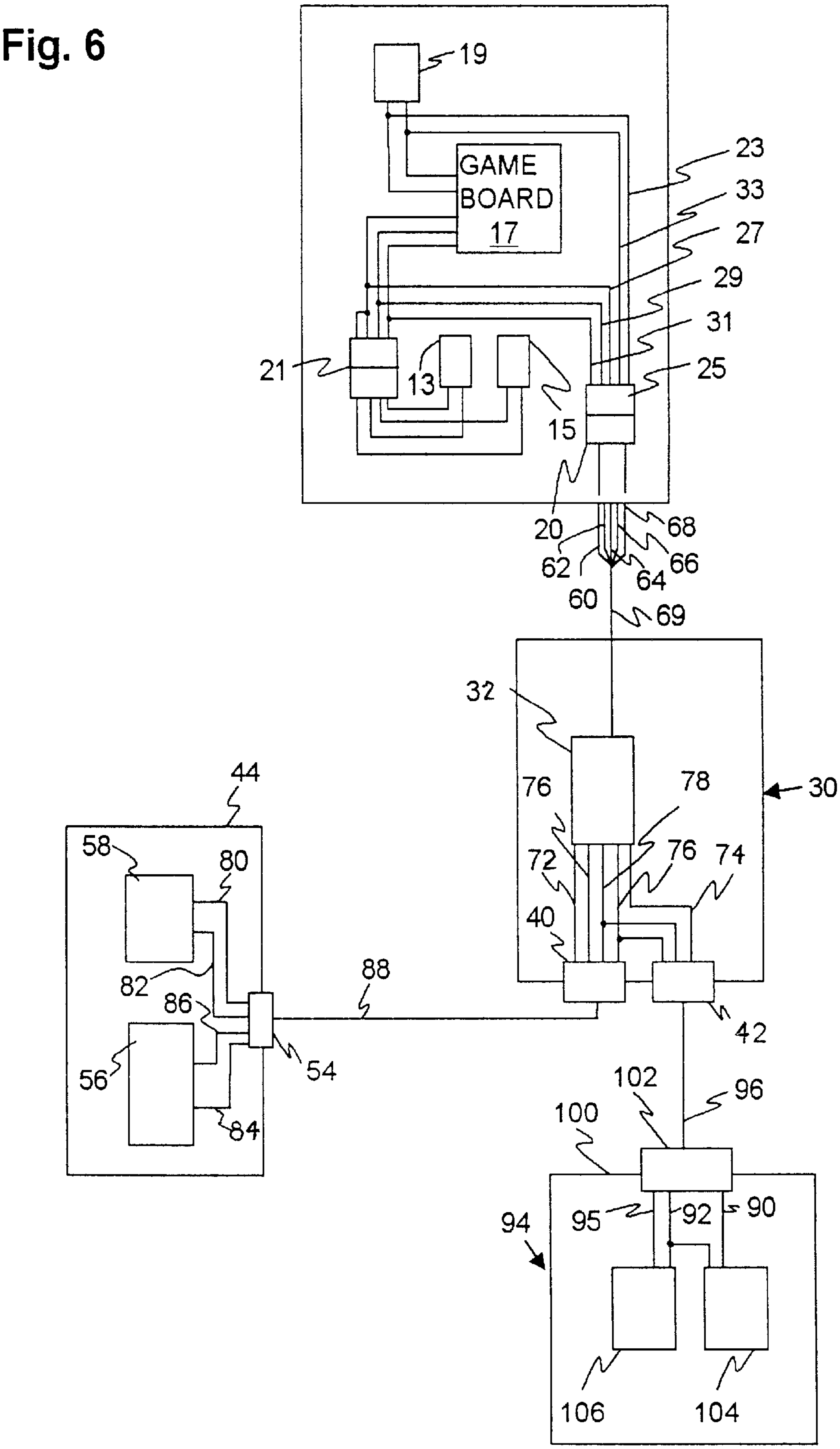
FIG. 6 is a diagrammatic view of the game credit-control apparatus of FIG. 4.

As shown, for example, in FIG. 6, gaming machine 12 has a game board 17 within the cabinet (not shown), a game harness 25 that cooperates with game board 17, a second game harness 20 coupled to game harness 25, a gaming-machine counter harness 21, a gaming-machine in-counter 13, and a gaming-machine out-counter 15. Game board 17 is powered by gaming machine 12 and transfers the total number of credits purchased by the player as well as the amount of credits the player has won or lost to game harness 25 and to gaming-machine counter harness 21. Gaming-machine counter harness 21 is in communication with gaming-machine in-counter 13 and a gaming-machine out-counter 15.

As shown in FIG. 6, Gaming machine 12 also includes an external reset push-button switch 19, or has two external wing nuts (not shown) that are in communication with game board 17 and are connected to allow clearing of the current credit totals from gaming machine 12. Credit totals are cleared from gaming machine 12 either by pressing push-button switch 19 or by touching both wing nuts (not shown) with a coin or other metal object. Also connected to game harness 25 are a system ground 23 and a reset signal via wire 33. In normal operation, game harness 25 is configured to receive an input counter signal indicating the amount of credit purchased for game via a wire 27. Once the player has finished playing gaming machine 12, gaming machine receives a signal via a wire 29 indicating the total amount of credits cashed-in. In addition, gaming machine has a twelve volt power line 31.

Control apparatus 10 of the present invention exploits power line 31, system ground 23, and the signals conveyed by wires 27, 29, 33 that are present on game board 17 to remove and transfer game credits to a remote location. To exploit game board 17, it is necessary to first connect system ground 23 to reset push-button switch 19. In addition, gaming machine counter harness 21 is disconnected from in and out counters 13, 15 because control apparatus 10 eliminates the need for in-counters 13 and out-counters 15 mounted on gaming machine 12. Although game boards 17 and game harnesses 25 have been described herein, it is understood that a wide variety of game boards and game harness that are commercially available and are well known within the gaming device industry are suitable for use with the present invention.

Control apparatus 10 of the present invention exploits game board 17, power line 31, system ground 23, and signals 27, 29, and 33 from gaming machine 12 and game harness 20 to remove game credits from bank 16 of gaming machines and to transfer the calculated game credit totals. As shown in FIG. 1, control apparatus 10 includes a junction box 30 and a credit controller 44. Each bank 16 of gaming machines 12 is provided with junction box 30. Junction box 30 communicates with each of game board 17 within bank 16 of gaming machines 12 via game harness 25 and is in electronic communication with credit controller 44. As shown in FIG. 1, junction box 30 includes six junction ports 32 and one gaming machine 12 is assigned one of the ports 32. It is understood, however that while six gaming machines 12 and a junction box 30 with six junction ports 32 are illustrated in FIG. 1, three junction ports or greater or fewer than six gaming machines 12 and a junction box 30 with greater or fewer than six junction ports 32 may be controlled and monitored by control apparatus 10 of the present invention.

Junction box 30 has side walls (not shown) and a cover (not shown) that cooperate to define a chamber (not shown) therein. Credit control connector 40 and accounting center connector 42 are mounted on one of side walls. See FIG. 6. Junction ports 32 extend through cover (not shown). Referring now to FIG. 6, junction box 30 is coupled to a reset wire 60 and a ground wire 62 that extend into harness 20 that is coupled to internal game harness 25. Thus, wires 60, 62 communicate with wires 33, 23 in gaming machine 12. In addition, game harness 20 of gaming machine 12 couples input counter wire 27 to a counter wire 64, twelve volt power line 31 to a power supply wire 66, and output counter wire 29 with a payout counter wire 68. As shown in FIG. 6, wires 60, 62, 64, 66, 68 extend as a bundle 69 into junction port 32 of junction box 30. Junction port 32 attaches wires 60, 62, 64, 66, 68 to counterpart wires within junction box 30.

Illustratively, junction box 30 houses a junction reset wire 70 that is connected to wire 60 and a junction ground wire 72 that is connected to wire 62. Reset and ground wires 70, 72 extend between junction port 32 and credit control connector 40. A junction payout counter wire 76 is connected to wire 68 and is split within junction box 30. Thus, payout counter wire 76 extends between junction port 32 and credit control connector 40 and accounting center connector 42. A junction power supply wire 78 is connected to power supply wire 66 and is also split within junction box 30. Power supply wire 78, therefore extends between junction port 32 and credit control connector 40 and accounting center connector 42. A junction power supply wire 78 is connected to power supply wire 66 and is also split within junction box 30. Power supply wire 78, therefore extends between junction port 32 and credit control connector 40 and accounting center connector 42.

Figure 2:
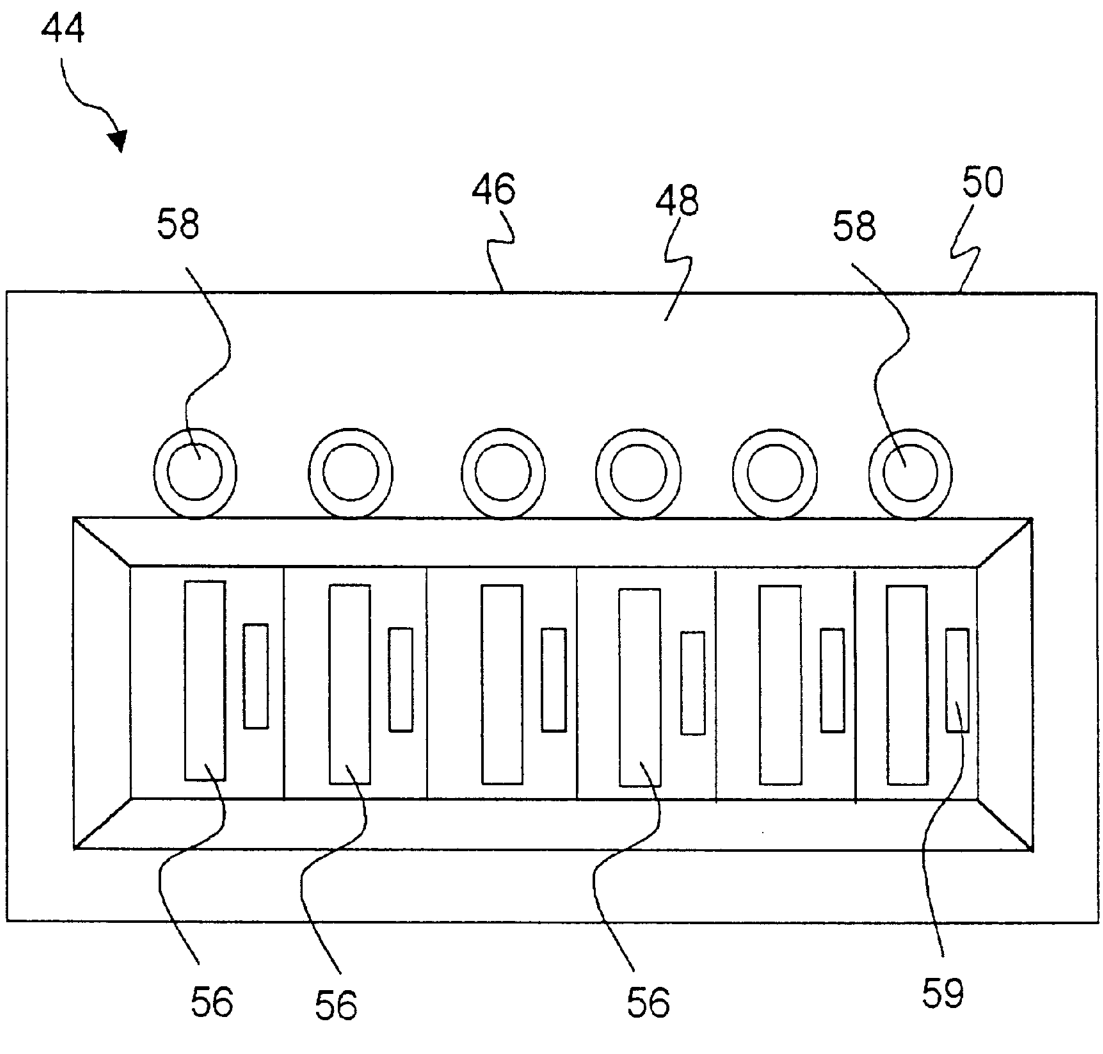
FIG. 2 is a top view of the credit controller showing the credit controller having credit clearing buttons and resettable hard counters.

Credit controller 44, as shown in FIGS. 1 and 2, includes a housing 46 that has a front face 48 and side walls 50 that define a cavity (not shown). In addition, one side wall 50 of housing 46 receives a wire connector 54 therein. See FIG. 6. A bank of six payout counters 56 and a bank of credit clearing buttons 58 extend through front face 48 of housing 46. As best shown in FIG. 2, each payout counter 56 is a resettable hard counter that includes a manual reset button 59 configured to clear the displayed credits on payout counter 56. It is understood, however, that a wide variety of resettable counters such as digital and the like are suitable for use with the present invention. Credit clearing buttons 58 are push-button switches, although it is understood that a variety of commercially available switches are suitable for use with the present invention.

While the electronic connection between one payout counter 56 and one clearing button 58 of controller 44 will be described, it is understood that the described connection applies to each payout counter 56 and clearing button 58. It is also understood that while six payout counters 56 and six buttons 58 are illustrated in FIG. 1, three payout counters and three buttons or greater or fewer than six payout counters 56 and six buttons 58 may be controlled and monitored by credit controller 44 of control apparatus 10 of the present invention.

As shown in FIG. 6, a controller reset wire 80 and a controller ground wire 82 extend between button 58 and wire connector 54 in credit controller 44. A controller counter wire 84 and a controller supply power wire 86 extend between payout counter 56 and wire connector 54. A connection cable 88 extends between wire connector 54 of credit controller 44 and credit control connector 40 of junction box 30. Connection cable 88 is formed to attach controller reset wire 80, controller ground wire 82, controller counter wire 84, and controller supply power wire 86 within credit controller 44 with corresponding wires 70, 72, 76, 78 within junction box 30.

In operation, payout counter 56 of credit controller 44 does not continuously monitor the stored credits of gaming machines 12. Rather, counter 56 is triggered upon the cashier pressing clearing button 58 on credit controller 44 that corresponds to gaming machine 12 that is being cashed-out by a player. To operate control apparatus 10, the player approaches credit controller 44 that is located within the establishment and remote from gaming machine 12 after playing gaming machine 12. The cashier must first be sure credits have been cleared from appropriate payout counter 56 before tallying the payout due to the player. As shown in FIG. 2, this credit clearing from counter 56 is performed by pressing clearing button 59 on payout counter 56.

To determine the proper payout due to the player, the cashier must only press credit clearing/reset button 58 on credit controller 44 that corresponds to gaming machine 12 that is being cashed-out by a player. Once reset button 58 is pressed, a reset signal is carried from credit controller 44 into individual game 12 where credits are cleared from game board 17 to reset the total credit amount to zero for that particular gaming machine. Game board 17, upon receiving reset signal also sends a pay-out counter signal to game harness 25. Harness 20 receives signal and carries signal back to junction box 30 where it is sent to payout counter 56 of credit controller 44.

Figure 3:
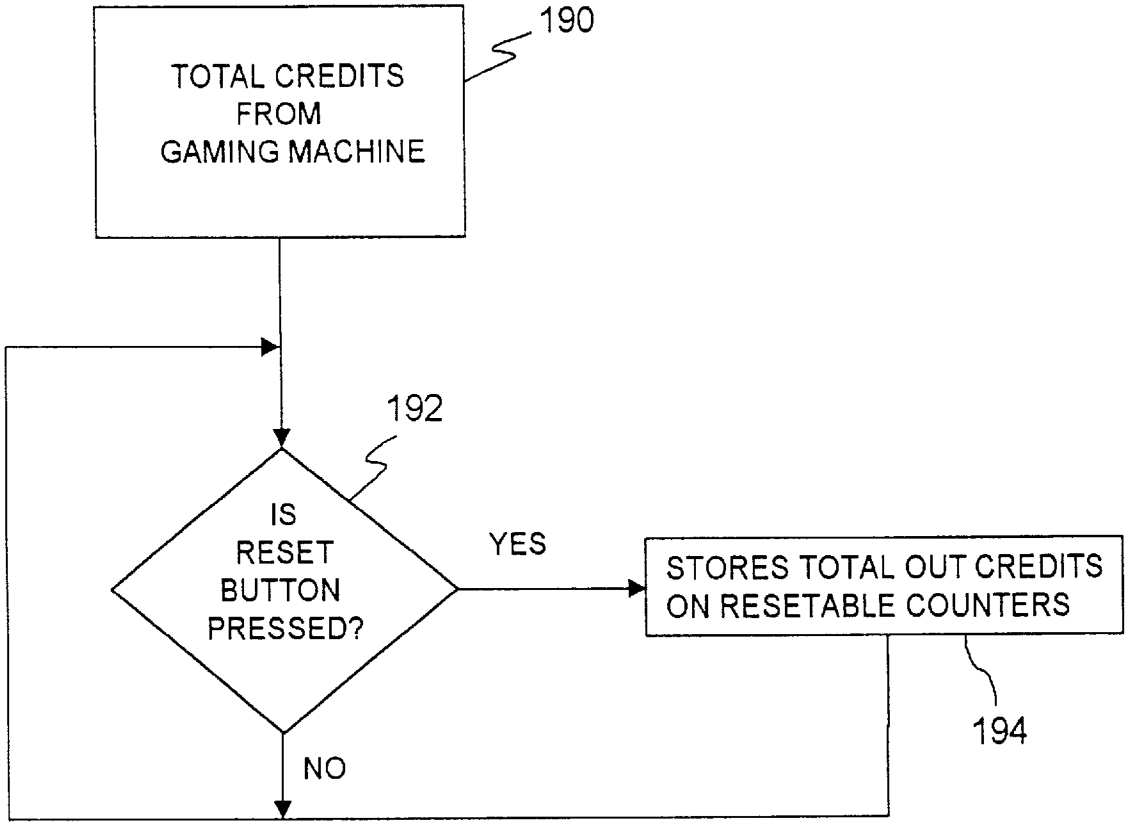
FIG. 3 is a flow chart of the game credit-control apparatus of FIG. 1.

As shown in FIG. 3, the total credits from gaming machine (box 190) are stored in gaming machine. Control apparatus 10 includes reset button and operates depending upon whether reset button is pressed (box 192). If reset button is pressed, credit controller stores the total out credits on the appropriate resettable counter (box 194). After storing the total out credits, or if the answer to box 192 is no, control apparatus 10 awaits the pressing of the reset button.

In an alternative embodiment of the present invention, a game-credit control apparatus 110 exploits existing game board 17, power line 31, system ground 23, and signals 27, 29, and 33 from gaming machine 12 and game harness 20 to remove game credits from bank 16 of gaming machines 12 and to transfer the calculated game credit totals to credit controller 44 as well as to an accounting center 28. Control apparatus 110 is shown in FIG. 4 and includes junction box 30, credit controller 44 and an accounting recorder 94 that is located within accounting center 28 or other convenient area.

Figure 4:
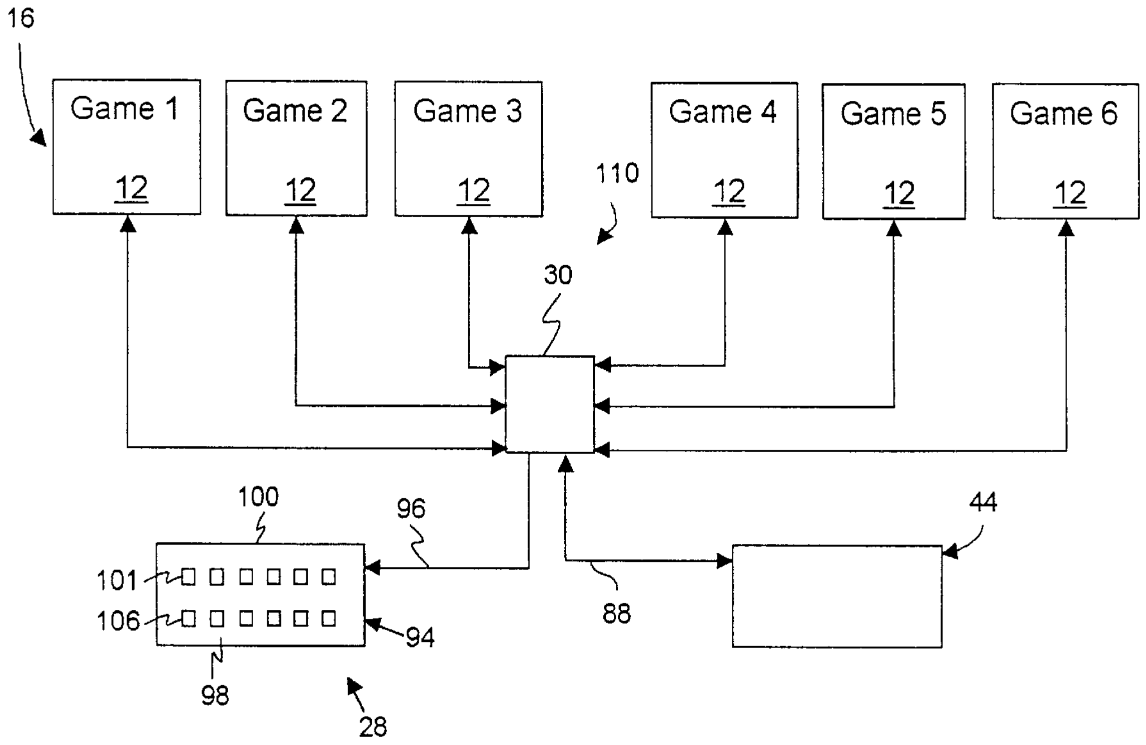
FIG. 4 is a diagrammatic view of a game credit-control apparatus in accordance with an alternative embodiment of the present invention attached to a gaming machine showing the control apparatus having a junction box, a credit controller, and an accounting recorder including a credit take-in counter and a pay-out counter.

Accounting recorder 94 is shown in FIG. 4 and includes a front wall 98 and side walls 100. One side wall 100 receives a wire connector 102 therein. See FIG. 6. A bank of six credit take-in counters 104 and a bank of six credit pay-out counters 106 extend through front face 48 of housing 46. Counters 104 and 106 are nonresettable hard counters. It is understood, however, that a wide variety of commercially available counters may be used in accordance with the present invention. While the electronic connection between one counter 104 and one counter 106 of recorder 94 will be described, it is understood that the described connection applies to each counter 104, 106. It is also understood that while six counters 104 and six counters 106 are illustrated and described herein, three counters 104 and three counters 106 or greater or fewer than six counters 104, 106 may be included in accounting recorder 94 of control apparatus 10 of the present invention.

An accounting power supply wire 92 extends between wire connector 102 and both counters 104, 106. See FIG. 6. An accounting input wire 90 extends between take-in counter 104 and wire connector 102 and an accounting output counter wire 95 extends between pay-out counter 106 and wire connector 102. A connection cable 96 extends between wire connector 102 and accounting center connector 42 of junction box 30. As best shown in FIG. 6, connection cable 96 is formed to attach accounting power supply wire 92, accounting input wire 90, and controller counter wire 84, and accounting output counter wire 95 of accounting recorder 94 with corresponding junction power supply wire 78, junction counter wire 74, and junction payout counter wire 76 within junction box 30.

To operate control apparatus 110 of the present invention, a player inserts a valid token or coin to into gaming machine 12 to play the game. A validator (not shown) present within gaming machine 12 sends an input signal to game board 17. Game board 17, in turn, sends the signal indicating the number of credits purchased via wire 27 to game harness 25. Harness 20 of control apparatus 10 receives signal indicating the number of credits purchased and transmits the input signal to junction box 30 and therefore to credit take-in counter 104 of accounting recorder 94. See FIG. 8. Thus, control apparatus 10 allows the operator of the gaming area to continuously monitor the amount of tokens or credits placed into each gaming machine 12 from accounting area 28 remote from gaming machine 12.

After playing gaming machine 12, the player approaches credit controller 44 that is located within the establishment and remote from gaming machine 12. Cashier clears the credits from appropriate counter 56 before tallying the payout due to the player and determines the proper payout due to the player as previously discussed. In addition, pay-out counter signal is split within junction box 30 and is also transmitted to pay-out counter 106 of accounting recorder 94. See FIG. 8. Pay-out counter 106 is only activated when the cashier presses credit clearing button 58. Thus, by comparing credit take-in counter 104 and pay-out counter 106, personnel in accounting center 28 can cross-check the total amount of credit purchased with the total amount of credit paid-out from each gaming machine 12. Pay-out counter 106 also provides personnel with sufficient information to cross-check the cashiers' drawer with the proper amount of credit that was to be paid out.

Figure 5:
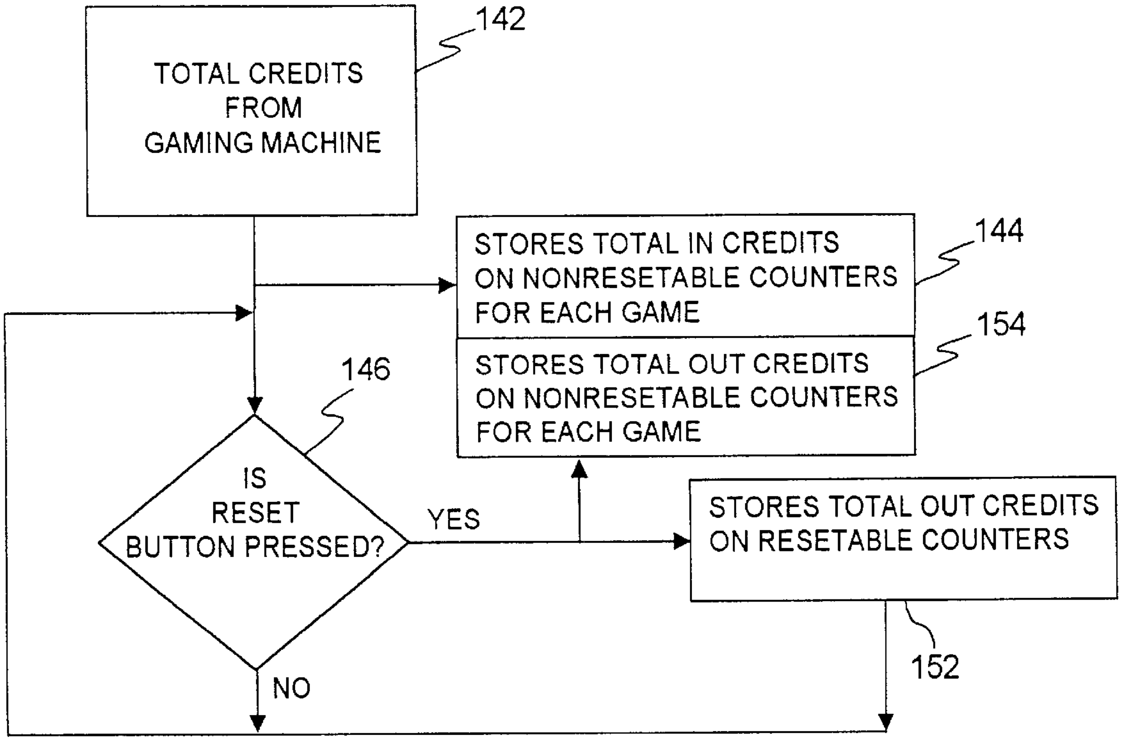
FIG. 5 is a flow chart of the game credit-control apparatus of FIG. 4.

Thus, as shown in FIG. 5, control apparatus 110 operates upon receiving a credit into gaming machine (box 142) and upon the pressing of the reset button (box 146). If a credit is received, the credit is sent to the appropriate credit take-in counter of the accounting controller (box 144). After the task of box 144 is completed or if a credit was not received, control apparatus 110 awaits either the insertion of another credit or the pressing of the reset button (box 146). If reset button is pressed, the total credits from the appropriate gaming machine are read and sent to resettable counter of credit controller (box 152). In addition, the total credits are sent to pay-out counter of accounting recorder (box 154). If the reset button is not pressed, control apparatus 110 again awaits either the insertion of another credit (142) or the pressing of reset button (146).

Figure 7:
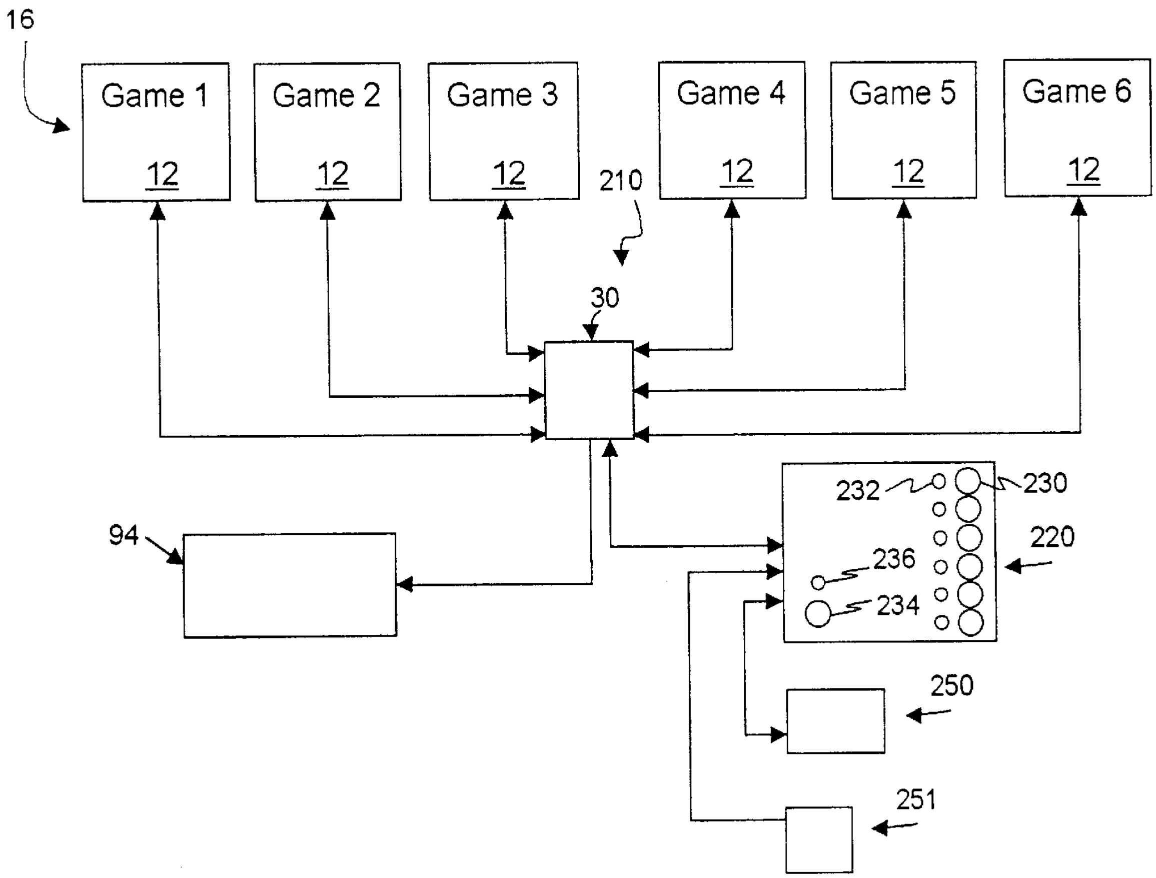
FIG. 7 is a diagrammatic view of a game credit-control apparatus in accordance with another alternative embodiment of the present invention attached to a gaming machine showing the control apparatus having the junction box, the accounting recorder, and a printer controller coupled to a printer and a power supply.

In still another embodiment of the present invention, a game-control apparatus 210 exploits existing game board 17, power line 31, system ground 23, and signals 27, 29, and 33 from gaming machine 12 and game harness 20 to remove game credits from bank 16 of gaming machines 12 and to transfer the calculated game credit totals to accounting center 28 as well as to print out the calculated game credit totals. Control apparatus 210 includes junction box 30, accounting recorder 94, and a printer controller 220. As shown in FIG. 7, printer controller 220 includes a bank of reset buttons 230 and a bank of LEDs 232. In addition, a print report button 234 as well as a clear memory key switch 236 are included in printer controller 220.

Figure 9:
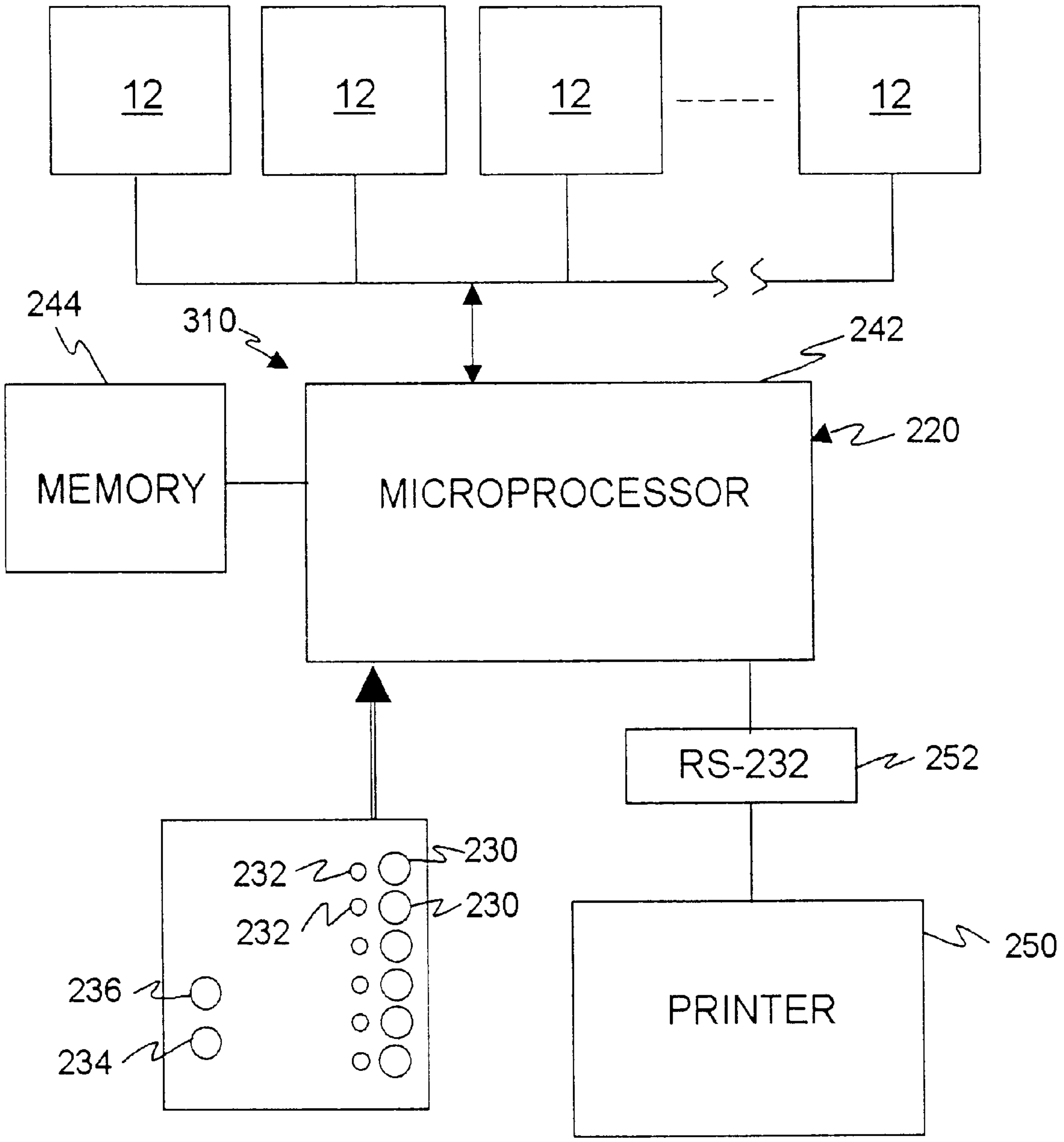
FIG. 9 is a diagrammatic view a game credit-control apparatus in accordance with another alternative embodiment of the present invention showing the printer controller including a print report button, a clear memory key switch, reset buttons, and light emitting diodes.

Referring to FIG. 9, printer controller 220 includes a microprocessor 242 model #PIC16C65A-10-P manufactured by Microchip Technology Inc., Chandler, Ariz. and a memory unit 244. It is understood that a variety of microprocessors are suitable for use with the present invention. Printer controller 220 communicates with gaming machines 12 via junction box 30. Junction box 30 is coupled to gaming machine 12 as previously discussed. As shown in FIG. 9, reset buttons 230 are coupled to computer and junction box 30. In addition, microprocessor 242 is coupled to printer 250 via a RS-232 connector 252 and is coupled to an AC adapter (See FIG. 7). It is understood, however, that a wide variety of connectors may be used in accordance with the present invention.

Control apparatus 210 of the present invention operates upon receiving a valid token or coin to into gaming machine 12 to play the game (box 158). If a credit is received, the credit is sent to and stored in the appropriate take-in counter of the accounting controller (box 16), upon the pressing of reset/print button (box 162), the pressing of report button (box 172), or activating of master clear switch (box 178). See FIG. 8. Upon completing game play, the player must only press reset/print button 230 on printer controller 220 (box 162) that corresponds to gaming machine 12 that player is cashing-out. If reset button 230 is pressed, a reset signal is sent through junction box 30 to game board 17. The reset signal clears credits from game board 17 to reset the credit amount to zero for that particular gaming machine.

Figure 8:
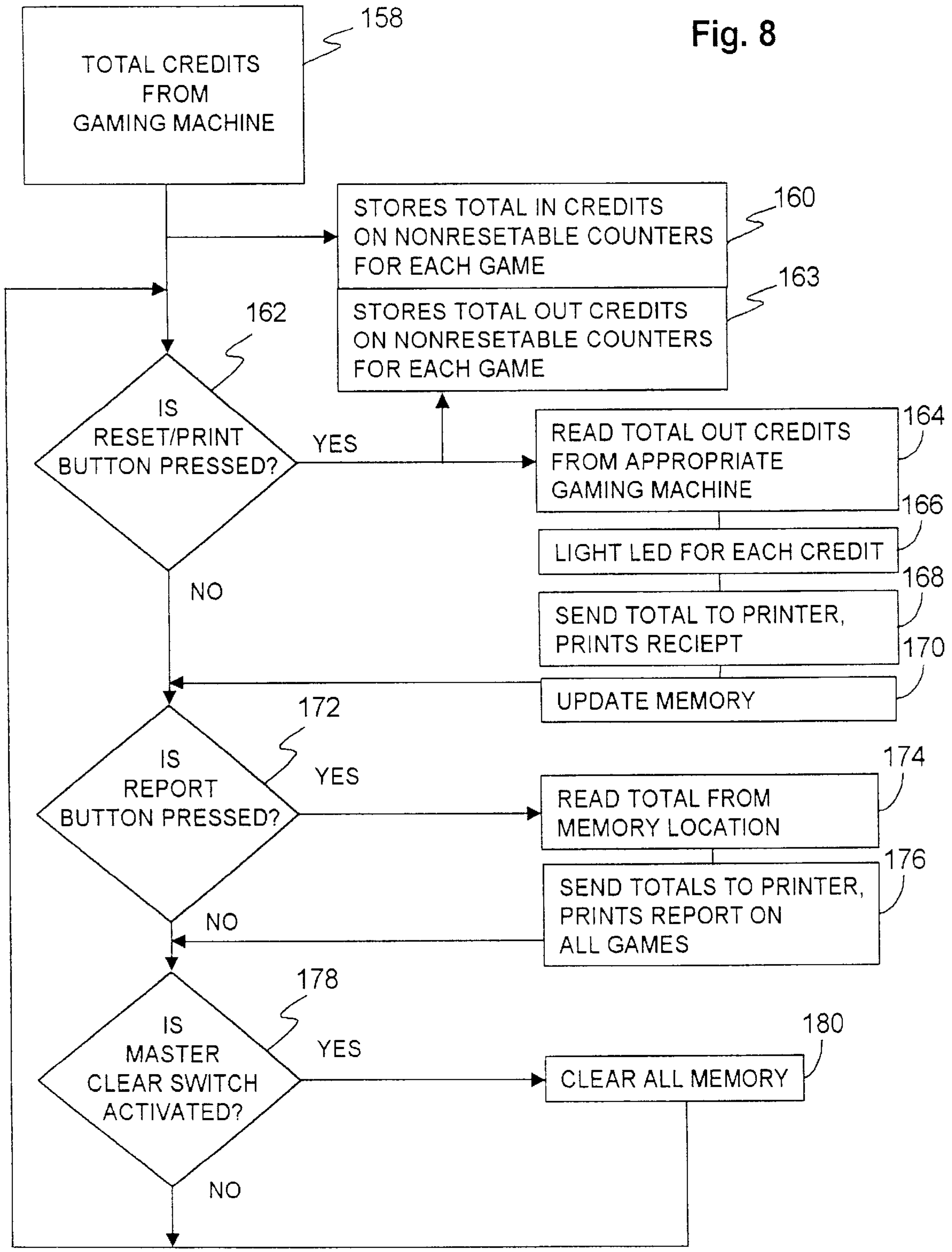
FIG. 8 is a flow chart of the game credit-control apparatus of FIG. 7.

In addition, as shown in box 164, if reset/print button is pressed (box 162), printer control 220 reads the total credits from the appropriate gaming machine (box 164). Then, the game board 17 sends a pay-out counter signal to game harness 25. Harness 20 receives the pay-out signal and transmits payout signal back to junction box 30 where it is sent to printer controller 220. Printer controller 220 receives payout signal and directs it to computer where, as shown in FIGS. 7–9, the LED is illuminated adjacent pressed reset button 230 that corresponds to gaming machine 12 that is being cashed-out (box 166).

The total credits are sent to the printer (box 168) where a report showing credits at time of redemption are printed. In addition, the stored memory in the memory unit 244 is updated (box 170) by adding the total credits to the stored total for each gaming machine 12. It is understood that memory unit 244 may store the information from gaming machines 12 in a variety of formats suitable to meet a variety of business needs. Additionally, if reset/print button is pressed (box 162) the accounting recorder stores the total out credits for each game (box 163).

After updating the stored memory, or if rest/print button has not been pressed, microprocessor 242, checks to see if the report button 234 has been pressed (box 172). If the report button is pressed, microprocessor 242 reads the total credits for all gaming units 12 from an appropriate memory location in memory unit 244 (box 174) and send them to printer 250 (box 176). It is understood that the report may be printed in a variety of formats, depending upon the business needs of the user. After sending the total credits to printer (box 176), or if report button is not pressed, microprocessor 242 checks to see if master clear switch 236 is activated (box 178). If master clear switch is activated, the memory unit is cleared of all of the stored memory (box 180). This clearing enables users to reset the collected credits to zero for each business day or other predetermined passage of time. After clearing the memory, or if master clear switch is not activated, microprocessor 242 checks to see if any of reset/print buttons 230 have been pressed or activated (box 162).

Figure 10:
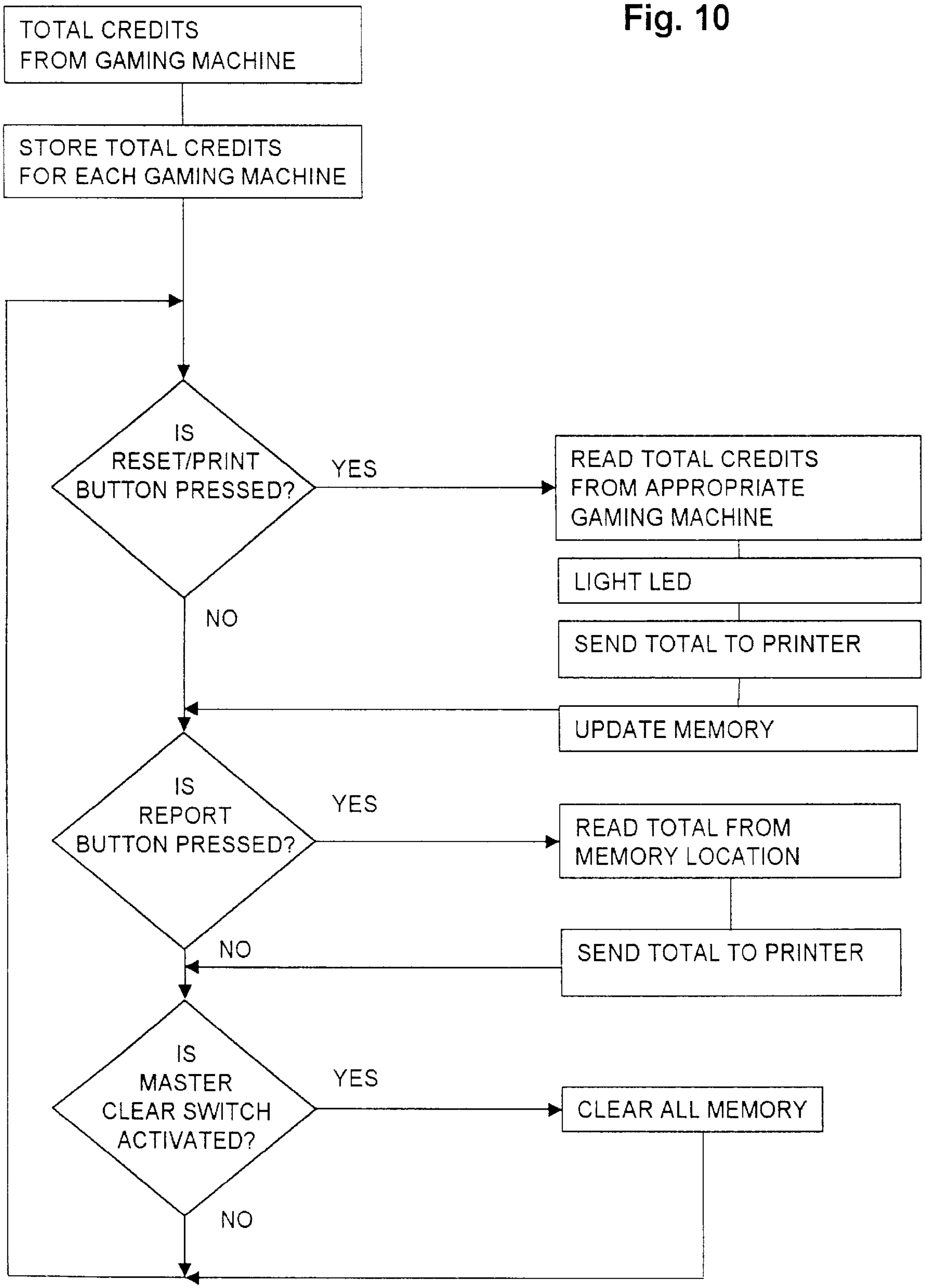
FIG. 10 is a flow chart of the game credit-control apparatus of FIG. 9.

In still another alternative embodiment of the present invention, game credit-control apparatus 310 is provided. See FIGS. 9 and 10. Control apparatus 310 exploits existing game board 17, power line 31, system ground 23, and signals 27, 29, and 33 from gaming machine 12 and game harness 20 to remove game credits from bank 16 of gaming machines 12 and to transfer the calculated game credit totals to printer controller 220 to print out the calculated game credit totals. Control apparatus 310 includes junction box (not shown) and a printer controller 220. Junction box and printer controller 220 are formed as previously discussed. Control apparatus 310 includes printer controller 220 coupled to printer 250 and power supply 251. Control apparatus 310 operates as illustrated in FIG. 10.

Figure 11:
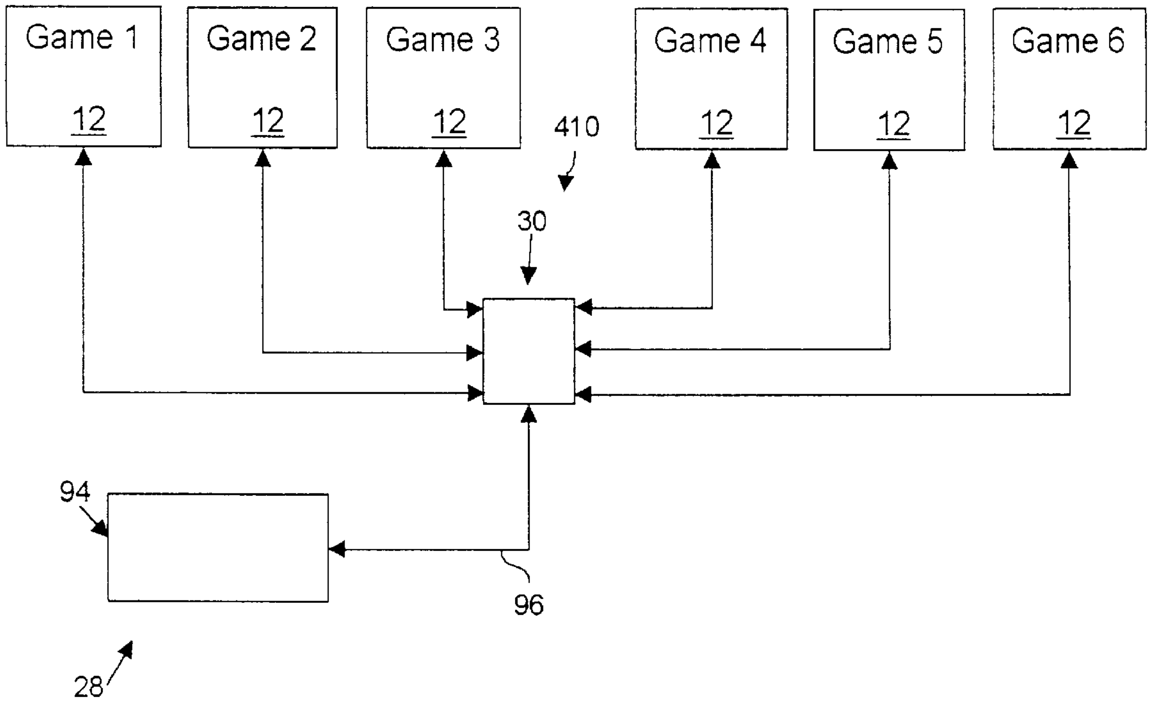
FIG. 11 is a diagrammatic view of the game credit-control apparatus in accordance with another alternative embodiment of the present invention showing the control apparatus including a junction box in communication with both a credit controller and an accounting recorder.
Figure 12:
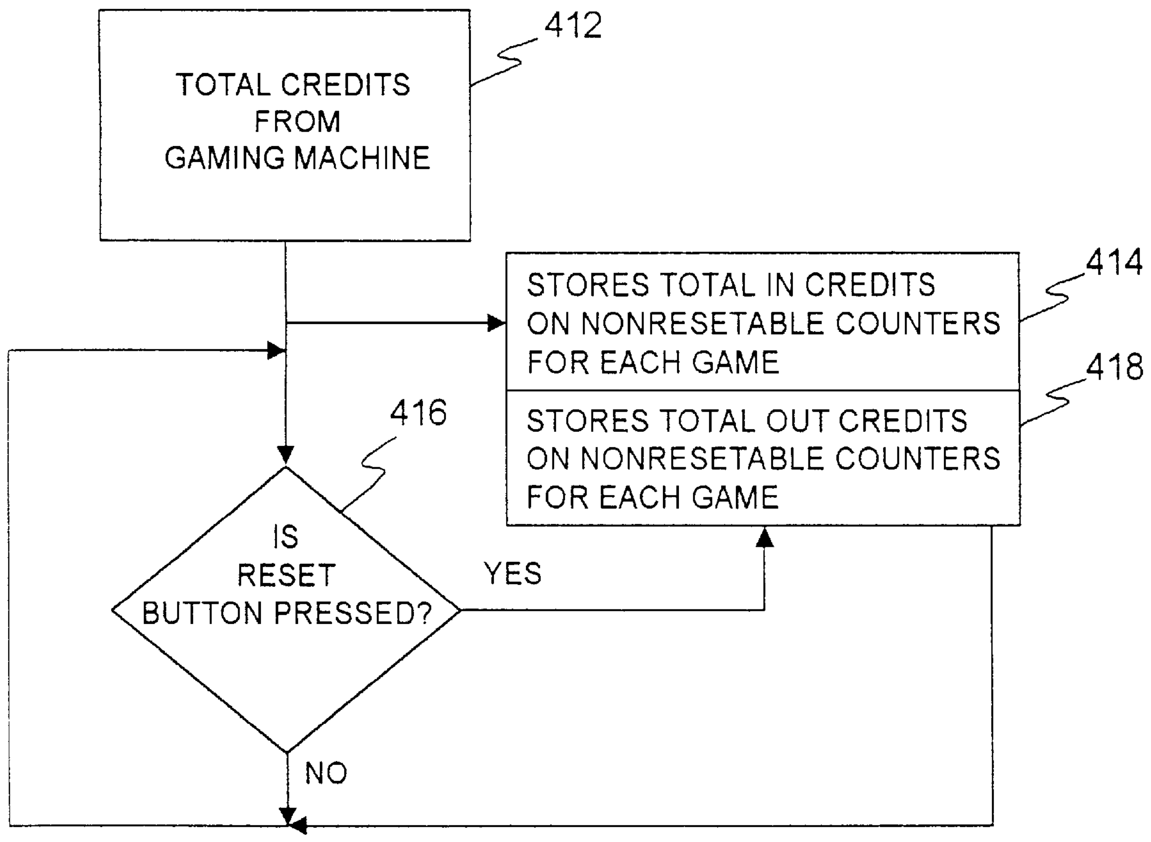
FIG. 12 is a flow chart of the game credit-control apparatus of FIG. 11.

Referring now to FIGS. 11 and 12, an alternative embodiment of game-credit control apparatus is illustrated. Control apparatus 410 includes accounting center 28 that includes a reset button. Referring now to FIG. 14, the total credits from gaming machine are stored in gaming machine (box 412). Control apparatus 410 operates by storing total in-credits on nonresettable counters for each game (box 414). Control apparatus 410 also operates depending upon whether reset button is pressed (box 416). If reset button is pressed, the total-out credits are stored on nonresettable counters for each game (box 418). After storing the total-out credits, or if the rest button is not pressed, control apparatus 410 continues to store the total-in credits on nonresettable counters for each game.

A control apparatus in accordance with the present invention transfers credit input and payout counts to a remote control center and to a remote accounting center. Thus, employees may remain in a central work area and carry on with other duties while redeeming game credits. In addition, the control apparatus does not interfere with other video games or players during credit redemption.

Although the invention has been described in detail with reference to a preferred embodiment, variations and modifications exist within the scope and spirit of the invention as described and defined in the following claims.

What is claimed is:

1. A game-credit control apparatus suitable for use with gaming machines each configured to store accumulated credits in response to a game and to transmit a counter signal of accumulated credits in response to receiving a reset signal, the game-credit control apparatus comprising a junction box including junction ports, each junction port being formed for communication with one gaming machine, and a credit controller including a connector communicating with the junction box, reset switches communicating with the connector and being formed to selectively trigger a reset signal, each reset switch corresponding to one of the junction ports, and a payout counting mechanism communicating with the connector, the payout counting mechanism being formed to receive the counter signal of accumulated credits.

2. The game-credit control apparatus of claim 1, wherein the payout counting mechanism is formed to display the accumulated credits transmitted by the counter signal.

3. The game-credit control apparatus of claim 2, further comprising an accounting mechanism in communication with the junction box and the accounting mechanism is formed to display the accumulated credits transmitted by the counter signal.

4. The game-credit control apparatus of claim 3, wherein the gaming machine is configured to transmit a credit signal for each inserted credit inserted and the junction box is configured to display the number of credits inserted into the gaming machine in response to receiving the credit signal.

5. The game-credit control apparatus of claim 2, wherein the junction box includes six junction ports and the controller includes six reset switches.

6. The game-credit control apparatus of claim 2, wherein the junction box includes three junction ports and the controller includes three reset switches.

7. The game-credit control apparatus of claim 1, further comprising a printer and the payout counting mechanism is formed to transmit the counter signal to the printer.

8. The game-credit control apparatus of claim 7, wherein the payout counting mechanism includes a memory unit formed to store accumulated credits of the counter signal.

9. The game-credit control apparatus of claim 8, wherein the controller includes a report switch in communication with the memory unit, the report switch is formed to selectively trigger a report signal to the memory unit and the memory unit is formed to transmit the stored accumulated credits to the printer in response to receiving the report signal.

10. The game-credit control apparatus of claim 8, wherein the controller includes a clear switch in communication with the memory unit, the clear switch is formed to clear the accumulated credits stored by the memory unit.

11. A game-credit control apparatus suitable for use with gaming machines each configured to store accumulated credits in response to a game and to transmit a credit signal for each inserted credit inserted and a counter signal of accumulated credits in response to a reset signal and, the game-credit control apparatus comprising a credit controller including reset switches, each reset switch being formed for communication with one gaming machine and formed to selectively trigger a reset signal, and payout counting mechanisms, each counting mechanism being formed for communication with one gaming machine and formed to receive the counter signal of accumulated credits in response to the reset switches triggering reset signals, and an accounting mechanism in communication with the credit controller, the accounting mechanism being formed to display the number of credits inserted into the gaming machine in response to receiving the credit signal and to display accumulated credits in response to receiving the counter signal.

12. The game-credit control apparatus of claim 11, further comprising a printer and the payout counting mechanism is formed to transmit the counter signal to the printer.

13. The game-credit control apparatus of claim 12, wherein the payout counting mechanism includes a memory unit formed to store accumulated credits of the counter signal.

14. The game-credit control apparatus of claim 13, wherein the controller includes a report switch in communication with the memory unit, the report switch is formed to selectively trigger a report signal to the memory unit and the memory unit is formed to transmit the stored accumulated credits to the printer in response to receiving the report signal.

15. The game-credit control apparatus of claim 14, wherein the controller includes a clear switch in communication with the memory unit, the clear switch is formed to clear the accumulated credits stored by the memory unit.

16. The game-credit control apparatus of claim 13, wherein the controller includes a clear switch in communication with the memory unit, the clear switch is formed to clear the accumulated credits stored by the memory unit.

17. The game-credit control apparatus of claim 11, wherein the accounting mechanism is formed to receive the counter signal of accumulated credits in response to the reset switches triggering reset signals.

18. A game-credit control apparatus suitable for use with gaming machines each configured to store accumulated credits in response to a game and to transmit a credit signal for each inserted credit inserted and a counter signal of accumulated credits in response to a reset signal and, the game-credit control apparatus comprising a junction box including junction ports, each junction port being formed for communication with one gaming machine, a credit controller including a connector communicating with the junction box, reset switches communicating with the connector and being formed to selectively trigger a reset signal, each reset switch corresponding to one of the junction ports, and a payout counting mechanism communicating with the connector, the payout counting mechanism being formed to receive the counter signal of accumulated credits, and an accounting mechanism in communication with the junction box, the accounting mechanism being formed to display the number of credits inserted into the gaming machine in response to receiving the credit signal and to display accumulated credits in response to receiving the counter signal.

19. The game-credit control apparatus of claim 18, wherein the payout counting mechanism is formed to display the accumulated credits transmitted by the counter signal.

20. The game-credit control apparatus of claim 18, further comprising a printer, the payout counting mechanism includes a memory unit formed to store accumulated credits of the counter signal and is formed to transmit the counter signal to the printer, and the controller further comprises a report switch in communication with the memory unit, the report switch is formed to selectively trigger a report signal to the memory unit and the memory unit is formed to transmit the stored accumulates credits to the printer in response to receiving the report signal.

* * * * *